United States Patent [19]

Frenette

[11] 4,240,498

[45] Dec. 23, 1980

[54] DIE CASTING MACHINE FOR FORMING INTERNALLY-THREADED ARTICLES

[76] Inventor: Remi Frenette, 1772 Verdun, St. Bruno, Quebec, Canada

[21] Appl. No.: 22,845

[22] Filed: Mar. 22, 1979

Related U.S. Application Data

[63] Continuation of Ser. No. 842,378, Oct. 11, 1977, abandoned.

[30] Foreign Application Priority Data

Jul. 5, 1977 [CA] Canada .................................. 282036

[51] Int. Cl.³ ........................................... B22D 17/24
[52] U.S. Cl. .................... 164/303; 164/340; 164/345; 164/347; 425/577
[58] Field of Search ............... 164/132, 345, 303, 340, 164/347; 249/59; 425/556, DIG. 58, 577

[56] References Cited

U.S. PATENT DOCUMENTS

| | | | |
|---|---|---|---|
| 2,363,808 | 11/1944 | Sayre | 425/556 |
| 2,579,952 | 12/1951 | Morin | 164/132 X |
| 2,984,862 | 5/1961 | Chabotte | 425/DIG. 58 |
| 3,152,365 | 10/1964 | Fisher | 249/59 |
| 3,165,796 | 1/1965 | McDonald | 164/345 |
| 3,905,416 | 9/1975 | Hammer | 164/132 |

FOREIGN PATENT DOCUMENTS

| | | | |
|---|---|---|---|
| 44-16550 | 3/1969 | Japan | 249/59 |
| 510668 | 8/1939 | United Kingdom | 164/345 |
| 458387 | 1/1975 | U.S.S.R. | 164/345 |

*Primary Examiner*—Robert D. Baldwin
*Attorney, Agent, or Firm*—Stevens, Davis, Miller & Mosher

[57] ABSTRACT

The specification discloses a die casting machine of the type adapted to form an article with an internal threaded portion. The threaded portion is formed by means of a threading device which is retractable. The threading device is rotatably and retractably operated by a pinion which in turn is rotated by a cog wheel. The die casting machine may contain a plurality of molding cavities, each being provided with the threading device. The cog wheels may be driven by a common rack which is hydraulically operated. Since the threading device of this invention is retractable, it is feasible to repeat a casting cycle without replacing the mold. Thus, it is much faster to fabricate such articles with the present machine than conventional die casting threading apparatus. Because no part is replaced or removed from the die casting machine in the present invention, it is possible to minimize possible dimensional variation among the articles fabricated. The specification also discloses a method for forming die casting including internal threaded portions by using the die casting machine according to the present invention.

3 Claims, 5 Drawing Figures

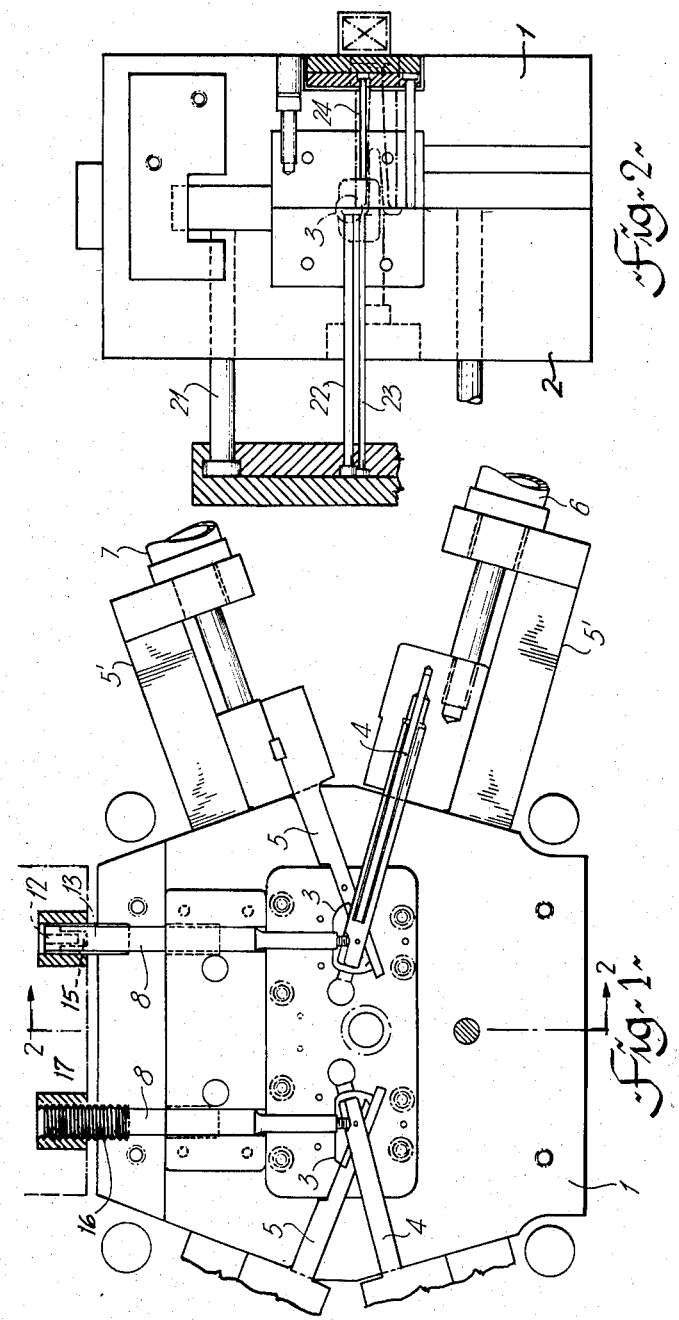

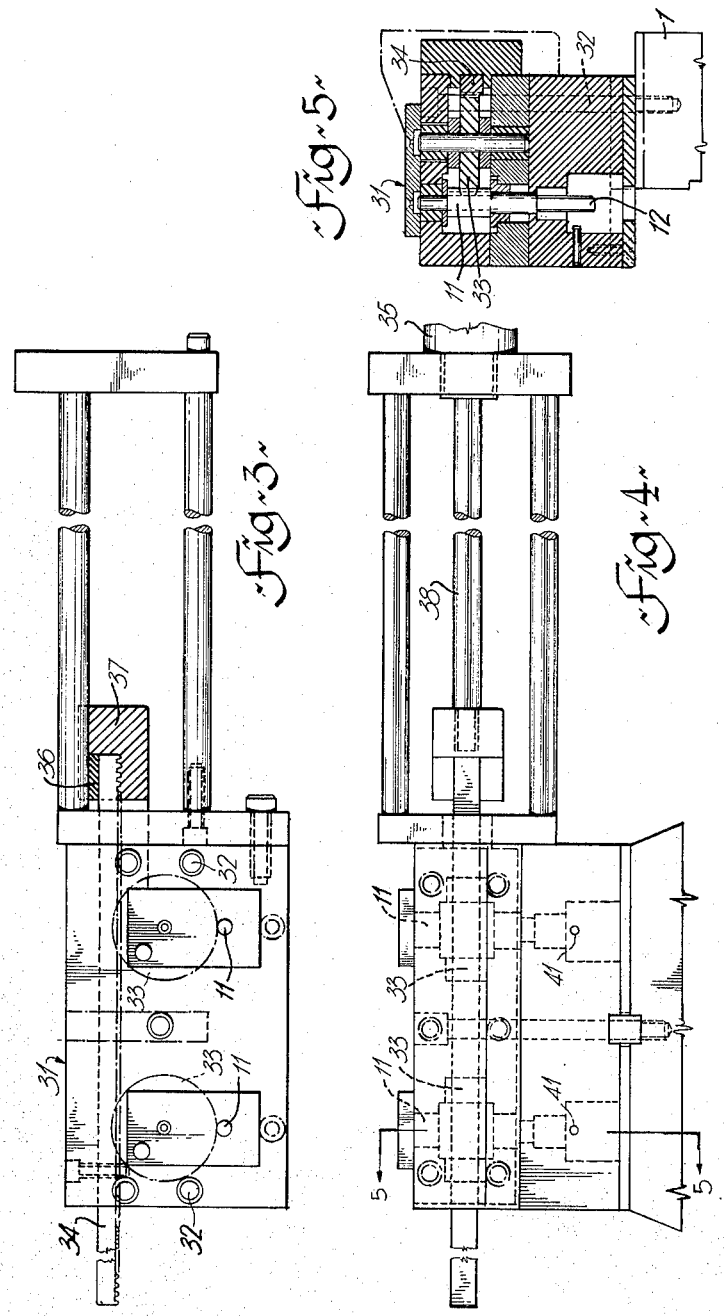

DIE CASTING MACHINE FOR FORMING INTERNALLY-THREADED ARTICLES

This is a continuation application Ser. No. 842,378 filed Oct. 11, 1977, now abandoned.

This invention relates to die casting machines and in particular to an internal threading device for use with die casting machines.

There have been known diverse methods or apparatus for making injection-molded or die-cast articles having internal threaded bores therein. For example, Canadian Pat. No. 487,726 issued Nov. 4, 1952 to Louis H. Morin discloses a method for forming threaded die castings. The method comprises supporting a thread forming member in part of the mold cavity of a pair of relatively movable dies with the dies held in closed position around the member. A casting material is then injected into the cavity while rotating the thread forming member to form a casting with an internal thread shaped by the thread forming member. Thereafter, the thread forming member is removed from the casting by virtue of the rotation of the member. Finally, the dies are opened to remove the casting thus formed.

Canadian Pat. No. 983,666 issued Feb. 17, 1976 to Wilfried Holzmann discloses an apparatus for the fabrication of ejection-molded or die-cast articles equipped with a thread such as screw-closing caps. In the Holzmann patent, the apparatus comprises a molding unit and a driving unit. The molding unit includes a plurality of molding cavities and respective cores rotatable in the cavities and having threaded portions at one end of each core. Each core is driven by its respective pinion provided with the driving unit. The core and driving pinion are releasably connected together. Each of the driving pinions are driven by a common driving gear via a shaft which is in turn connected with a sprocket wheel of a main drive.

Both Morin and Holzmann patents disclose a threaded core or threaded cores which are rotated by means of gears on a singular plane. Therefore, the threaded core or cores cannot be retracted during its withdrawal from the cavity (cavities). It is necessary for the casting apparatus of each of the Morin and Holzmann patents that the driving unit must be removed to unthread the threaded core from the casting after each completing of casting. In the Holzmann patent, the molding unit including the threaded cores is removed from the casting apparatus after completion of the casting and a new molding unit is thereafter installed for the next casting. Thus, it is necessary to fabricate a new threading device for each molding unit or new casting. The casting apparatus of the Morin and Holzmann patents are, accordingly, unsuitable for a large scale fabrication of castings.

The apparatus of the Morin and Holzmann patents are accompanied with a further drawback. Since the mold has to be removed after each casting cycle, there is a possibility of returning the threaded core to a location which is somewhat deviated from an intended location. This may not result in a true tapped hole, flash free, which means that the helix formed by the pitch of the thread does not perfectly match with the mating core and cavities. In addition, it takes considerable time to remove the gear boxes or devices of these prior art apparatus from the mold if one wants to use another mold.

A primary feature of this invention is to provide a casting machine which is suitable for a large scale fabrication of cast articles with internal threads.

Another feature of this invention is to provide such a casting machine as above, in which a gear box is easily removable from a mold and can be replaced without taking the mold out of the machine.

In one aspect of this invention there is provided a die casting machine of the type having a mold consisting of a stationary mold half and a movable mold half forming at least one molding cavity therebetween adapted to mold an article, at least one port formed through the mold and communicating into each cavity to charge a casting material into the cavity and at least one threading device extending into each cavity through a respective bore formed through the mold and adapted to form a threaded hole in the article wherein said threading device is axially retractable and rotatably driven by an outer driving means.

In another aspect of this invention, there is provided such a die casting machine as above wherein said threading device comprises an upper rod having a lower end portion which is generally rectangular in cross-section and a lower rod having an upper end portion which is provided with an elongated central opening axially and slidably encompassing the lower end portion of the upper rod, and said lower rod is provided with threads in the outer wall surface thereof which engage threads provided in the corresponding wall surface of the bore formed in the mold.

In a still further aspect of this invention, there is provided a method for forming die castings including internal threaded portions, which comprises extending a retractable threading device in part of the molding cavity of a set of relatively movable mold halves with the halves held in the closed position around the threading device, injecting a casting material into the cavity, casting the casting material, pulling the threading device out from the casting by rotating the threading device to retract the same, and opening the mold halves to remove the casting thus formed.

The above objects and aspects of the present invention will become more readily apparent from the following description, reference being made to the accompanying drawings in which:

FIG. 1 is a side view of the molding unit of the casting machine according to an embodiment of this invention;

FIG. 2 is a cross-sectional view taken along the line 2—2 in FIG. 1;

FIG. 3 is a top plan view of the driving unit of the casting machine in FIG. 1;

FIG. 4 is a side view of the driving unit in FIG. 3; and

FIG. 5 is a partial cross sectional view taken along the line 5—5 in FIG. 4.

Referring to FIG. 1, the numeral 1 designates a stationary mold half and articles 3,3 have already been threaded and cast. The articles 3,3 are by example members for mounting a rear view mirror on the interior of an automobile windshield. Core members 4, 5 are respectively mounted for reciprocal movement on guides 5' by hydraulic cylinders 6,7. Threading pins 8 extend into the articles 3 at the threaded ends thereof. The top of each of the threading pins 8 are detachably engaged with respective pinions 11. Each of the threading pins 8 consists of two members, an upper member 12 and a lower member 13. The upper member 12 has a generally rectangular lower end portion 14 as seen in FIG. 5. The lower member 13 has a central bore 15 at the top portion thereof, which slidably engages the lower end portion 14 of the upper member 12. The lower member 13 is equipped at the outer surface adjacent to the upper extremity thereof with threads 16 which in turn engage the corresponding threads 17 of the die casting machine.

As shown in FIG. 2, movable die half 2 is provided with a return pin 21 which in turn is connected with a hydraulic cylinder (not shown). There are two ejector pins 22, 23 extending as far as the outer periphery of the cavity confining the article 3. An ejector pin 24 is also provided with the stationary mold half 1.

Now referring to FIGS. 3 to 5, a gear box 31 is detachably mounted on the stationary die half 1 by means of bolts 32. The gear box 31 contains a pair of pinions 33 which engage a rack 34 which is operatably connected with a hydraulic cylinder 35 via a rack clamp 36, a cylinder yoke 37 and a cylinder rod 38. The pinions 33 engage their respective pinions 11 at the opposite sides thereof to the rack 34.

The operation of the die casting machine in FIGS. 1 to 5 is carried out as follows. The stationary die half 1 and movable die half 2 are closed together. All the core members 4, 5 and the threading pins 8 are placed in position within the respective cavities. The core members 4, 5 are operated by the hydraulic cylinders 6, 7 respectively. The threading pins 8 are placed in position by means of pinions 11 which in turn are rotated by the respective pinions 33 that are rotated by means of the rack 34 which in turn is operated by the hydraulic cylinder 35. After completion of forming the cavity which corresponds to the shape of the article, a castable material is injected under pressure through a port (not shown) into the cavity. Thereafter the threading pins 8 are drawn out by actuating the hydraulic cylinder 35 to the direction opposite to that actuated when the threading pins are extended into the cavities. Simultaneously, the core members 4,5 are also pulled out from the respective cavities by retracting the hydraulic cylinders 6,7. The threading pins 8 are retracted through the action of the upper member 12 being rotated by means of its respective pinion 11 causing the lower member 13 to be screwed upwardly through the engagement of the threads thereof 16 with those 17 of the casting machine.

After pulling out all of the core members and the threading pins from the articles, the movable mold half 2 is opened and ejector pin 24 ejects the part from the stationary mold half 1, the ejector pins 22, 23 holding the article thus cast at the cavity half of the movable mold half 2. Then, as the movable half 2 is further withdrawn, the ejector pins 22, 23 finally eject the part from the movable mold half. Thus, one cycle of casting has been completed. Because of the retractable nature of the threading pins, the casting operation is repeated without changing the mold. All of the core members and threading pins are not removed during the repeated operation and therefore it is possible to minimize possible dimensional variation of the articles.

While I have described and illustrated one form which my invention may take it will be apparent to those skilled in the art that other embodiments, as well as any modifications of that disclosed, may be made and practiced without departing in any way from the spirit or scope of the invention, for the limits of which reference must be made to the appended claims.

I claim:

1. In a die casting machine of the type having a mold comprising a stationary mold half and a movable, driven mold half forming between them molding cavities adapted to mold articles, with at least one part formed through the mold and communicating into each of said cavities to charge a casting material into the cavities; the improvement comprising a pair of threading devices extending into said cavities at an angle with respect to the plane of operation of said molds and through respective bores formed in the mold, said devices being adapted to form a threaded hole in articles formed in said cavities; means for operating the movable mold half to move it toward and away from the stationary mold half; and driving means, independent of the operating means, mounted externally of the molds on the stationary mold half for rotating said threading devices to run them in and out of said cavities, each said threading device being axially retractable from and insertable into the cavity only by rotation by said driving means and comprising an elongated rod member having interconnected upper and lower portions, the upper portion being integrated to the external driving means and the lower portion having a first thread on its lower end and protruding into the mold cavity for casting therearound and a second thread outside the cavities and engaging corresponding threads in the mold for axially lowering and raising the lower, threaded portion of the rod member when said rod member is rotated by the external driving means; said driving means comprising a gear box detachably mounted on the stationary mold half and containing a pair of pinions and a linearly operated rack; said driving means being operable to rotate and thereby axially retract the threading devices from the cavities before the operating means moves the movable mold half away from the stationary mold half and also being operable to rotate and thereby axially insert the threading devices into the cavities after the operating means moves the movable mold half towards the stationary mold half; the upper ends of said threading rod members incorporating geared pins adapted for rotation by said pinions when the rack is linearly operated thereby raising and lowering the threading rod members.

2. The die casting machine as in claim 1, further comprising means adapted to eject the article after completion of each casting cycle.

3. The die casting machine as in claim 2, wherein the ejecting means comprises at least one ejector pin provided through a respective bore formed in the movable mold half, and at least one ejector pin provided through a respective bore formed in the stationary mold half.

* * * * *